(12) United States Patent
Holtz et al.

(10) Patent No.: US 8,585,552 B2
(45) Date of Patent: Nov. 19, 2013

(54) TORQUE CONVERTER CLUTCH LOCK ON METHOD AND LOW SLIP REGULATION

(75) Inventors: Vincent Holtz, Rosheim (FR); Jean Sieffert, Lingolsheim (FR)

(73) Assignee: GM Global Technology Operations LLC

( * ) Notice: Subject to any disclaimer, the term of this patent is extended or adjusted under 35 U.S.C. 154(b) by 1337 days.

(21) Appl. No.: 11/496,974

(22) Filed: Aug. 1, 2006

(65) Prior Publication Data

US 2008/0032860 A1 Feb. 7, 2008

(51) Int. Cl.
*B60W 10/02* (2006.01)
*F16H 61/48* (2006.01)

(52) U.S. Cl.
USPC .......................................... 477/175; 477/57

(58) Field of Classification Search
USPC ........... 477/53, 54, 57, 58, 62, 64, 65, 76, 83, 477/84, 97, 98, 168, 169, 174, 175, 176
See application file for complete search history.

(56) References Cited

U.S. PATENT DOCUMENTS 5,531,302 A * 7/1996 Koenig et al. .................. 192/3.3
7,346,442 B2 * 3/2008 Higashimata et al. .......... 701/67

FOREIGN PATENT DOCUMENTS

| CN | 1616854 | 5/2005 |
| CN | 1699698 | 11/2005 |
| CN | 1769745 | 5/2006 |
| DE | 69524503 | 8/2002 |

\* cited by examiner

*Primary Examiner* — Roger Pang

(57) ABSTRACT

A torque converter clutch control system is provided. The system includes: a mode determination module that selects one of a lock low slip regulation mode and a hard lock mode based on a lock request; and a pressure control module that regulates pressure to the torque converter during the lock low slip regulation mode such that a target slip is maintained and commands a maximum pressure to the torque converter during the hard lock mode to prevent slip.

24 Claims, 4 Drawing Sheets

TORQUE CONVERTER CLUTCH LOCK ON METHOD AND LOW SLIP REGULATION

FIELD

The present disclosure relates to methods and systems for controlling a torque converter clutch.

BACKGROUND

The statements in this section merely provide background information related to the present disclosure and may not constitute prior art.

Automatic transmissions use a fluid clutch known as a torque converter to transfer engine torque from the engine to the transmission. The torque converter operates through hydraulic force provided by pressurized fluid from the automatic transmission. The torque converter multiplies engine torque and directs it through the transmission.

A conventional torque converter includes a sealed chamber filled with hydraulic fluid. The chamber includes a pump (or impeller) driven by the engine, a turbine connected to an output shaft, and a stator that provides torque multiplication. As the impeller rotates, the centrifugal force pushes the pressurized fluid outward, causing the turbine to rotate. Fluid exiting the turbine strikes the stator. Blades of the stator act to reverse the radial direction of the fluid's motion so that the fluid is moving the same direction as the impeller when it reenters the impeller chambers. This reversal of direction greatly increases the efficiency of the impeller. The force of the fluid striking the stator blades also exerts torque on the turbine output shaft, providing additional torque multiplication equivalent to a higher numerical gear ratio.

A torque converter is said to "slip" when the impeller speed and the turbine speed are not equivalent. High slip rates reduce the torque converters efficiency and may generate excessive heat. Some converters incorporate a lockup mechanism such as a mechanical clutch that engages at cruising speeds to physically link the impeller with the turbine. The physical link causes the impeller and the turbine to rotate at the same or near the same speed, thereby reducing or eliminating slip. The clutch is applied and released via fluid supplied through a hollow shaft at the center axis of the rotating converter assembly.

Locking the torque converter clutch is not desirable in all modes of vehicle operation. Typically the torque converter clutch can only be fully locked during high speed, low throttle (cruising) conditions. To achieve the benefits of locking the torque converter clutch during other modes of operation, a material can be added to the clutch to improve its overall durability during slip conditions. This allows the clutch to be partially locked. Slip on these types of torque converters is electronically controlled to be near a target value (most commonly 20 rpm).

The degree of engaging the torque converter clutch may be regulated by commanding the torque converter to operate in one of a plurality of modes. When an "on mode" is commanded, pressure to the clutch is electronically controlled to achieve the target slip value. The converter is not completely locked. When a "lock on mode" is commanded, a maximum pressure is supplied to the torque converter to fully lock the torque converter clutch. Slip is essentially eliminated in the lock on mode. Throughout the drive cycle, torque converter operation transitions between these and other modes. Regulating the pressure supplied to the torque converter during these transitions improves the overall drivability of the vehicle.

SUMMARY

Accordingly, a torque converter clutch control system is provided. The system includes: a mode determination module that selects one of a lock low slip regulation mode and a hard lock mode based on a lock request; and a pressure control module that regulates pressure to the torque converter during the lock low slip regulation mode such that a target slip is maintained and commands a maximum pressure to the torque converter during the hard lock mode to prevent slip.

In other features, a method of controlling a torque converter clutch (TCC) is provided. The method includes: receiving a request to lock the torque converter clutch; transitioning to a lock low slip regulation mode; and commanding pressure such that a target slip is maintained during the lock low slip regulation mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
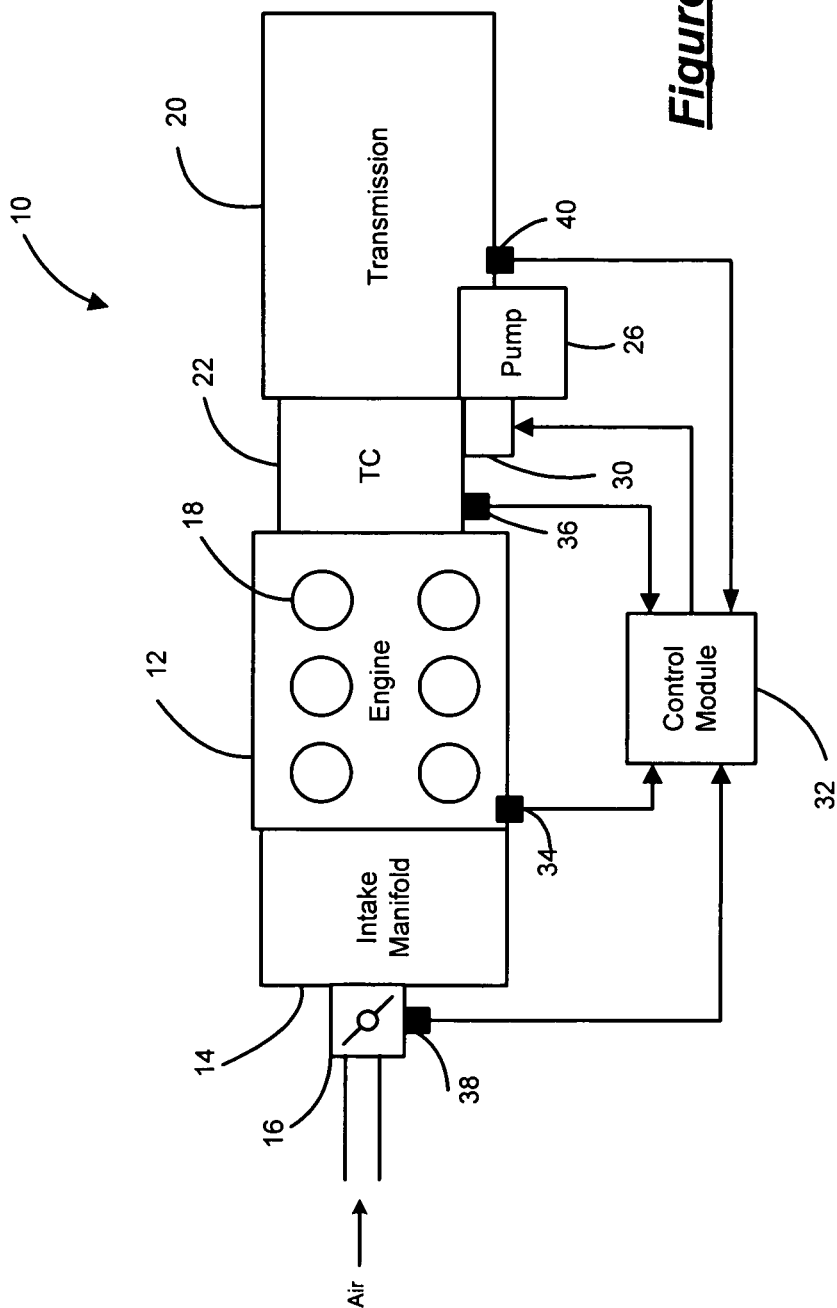
FIG. 1 is a functional block diagram of a vehicle including a conventional torque converter system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 illustrates a vehicle 10 that includes a conventional torque converter system. An engine 12 combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although six cylinders 18 are illustrated, it can be appreciated that the engine can have a plurality of cylinders including, but not limited to, 2, 3, 5, 6, 8, 10, 12 and 16 cylinders.

Torque from the engine 12 is supplied to a transmission 20 through a torque converter (TC) 22. The torque converter may be any known lockup converter including a turbine, a stator, and a torque converter clutch (TCC). The transmission includes a hydraulic pump 26 that regulates pressurized fluid within the transmission and controls fluid flow to and from the TC 22 via at least one solenoid-operated valve 30. The engine 12 drives the hydraulic pump 26. A current and/or pulse width modulated signal is output by a control module 32 to the solenoid in order to vary the supply of pressurized fluid to the torque converter 22. A slip rate of the TC 22 is varied based on control of the pressurized fluid.

The control module 32 determines the appropriate signal based on inputs received from the TC 22, the engine 12, and the transmission 20. Inputs to the control module 32 may include, but are not limited to: an engine speed signal received from an engine speed sensor 34; a turbine speed signal received from a turbine speed sensor 36; a throttle position signal received from a throttle position sensor 38; and a transmission oil temperature signal received from a transmission oil temperature sensor 40. The control module 32 determines when TCC lock on mode is desirable according to conventional methods. When TCC lock is desired, the control module 32 determines the appropriate pressure to be supplied to the TC 22 based on the TCC lock on method of the present disclosure and commands the signal to the solenoid 30 accordingly.

Figure 2:
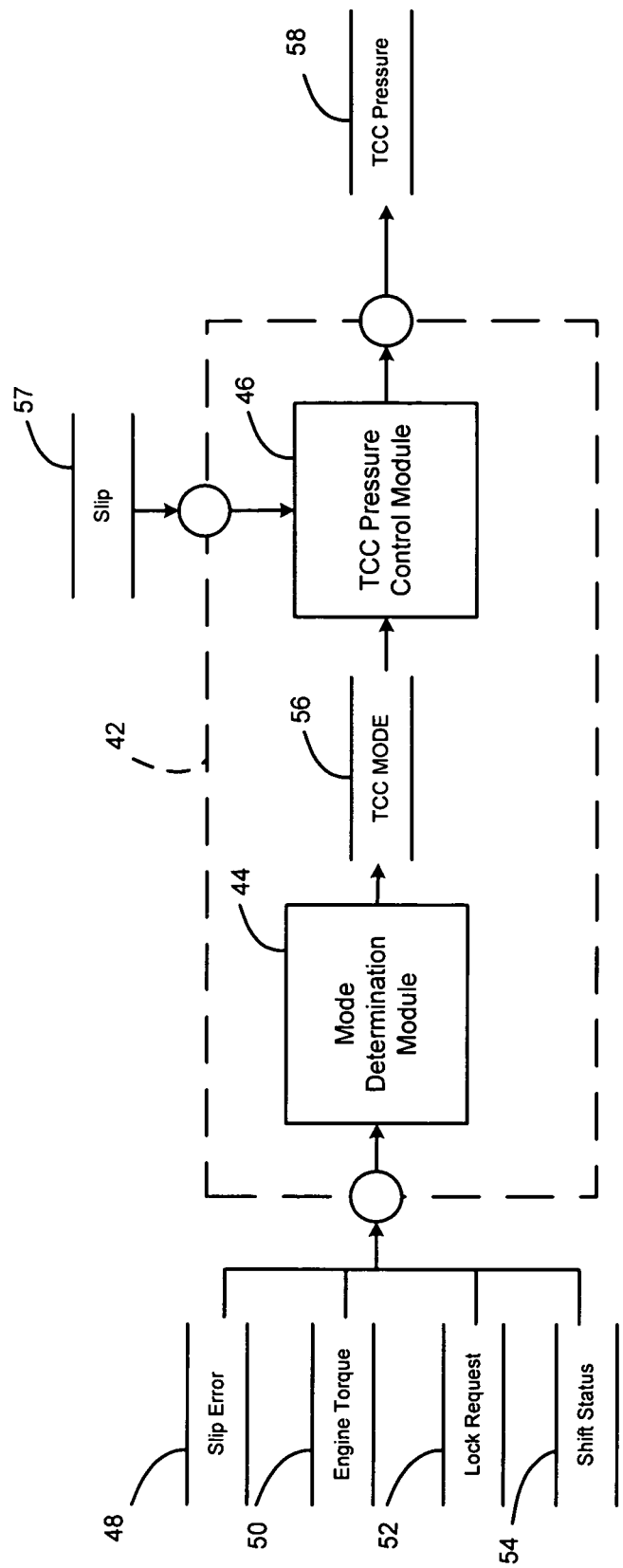
FIG. 2 is a dataflow diagram of a torque converter control system.

Referring to FIG. 2, a dataflow diagram illustrates various embodiments of a TCC lock on control system that may be embedded within the control module 32. Various embodiments of TCC lock on control systems according to the present disclosure may include any number of sub-modules embedded within the control module 32. The sub-modules shown may be combined and/or further partitioned to similarly control a torque converter clutch. In various embodiments, the control module 32 of FIG. 2 includes a mode determination module 44 and a TCC pressure control module 46.

The mode determination module 44 receives as input TCC slip error 48, engine torque 50, a lock request 52, and a shift status 54. The inputs may be determined by other sub-modules within the control module 32 or by other control modules (not shown) within the vehicle 10. The TCC slip error 48 may be determined as the difference between a desired slip and an actual measured slip. The actual measured slip 57 input to the TCC pressure control module 46 may be determined as the difference between engine speed and turbine speed. Engine torque 50 may be determined based on various engine operating parameters such as airflow, engine speed, load, and temperature values. The lock request 52 indicates a desired lock mode. The shift status 54 indicates the current status of an upshift or downshift. Based on the inputs received, the mode determination module 44 determines a current lock mode 56 to be at least one of a lock low slip regulation mode and a hard lock mode, as will be discussed further below. The TCC pressure control module 46 receives as input the TCC lock mode 56 and TCC slip 57. The TCC pressure control module 46 regulates pressure to the torque converter 22 (FIG. 1) such that the clutch is locked. Based on the TCC lock mode, the pressure is varied to control the intensity of the TCC lock.

Figure 3:
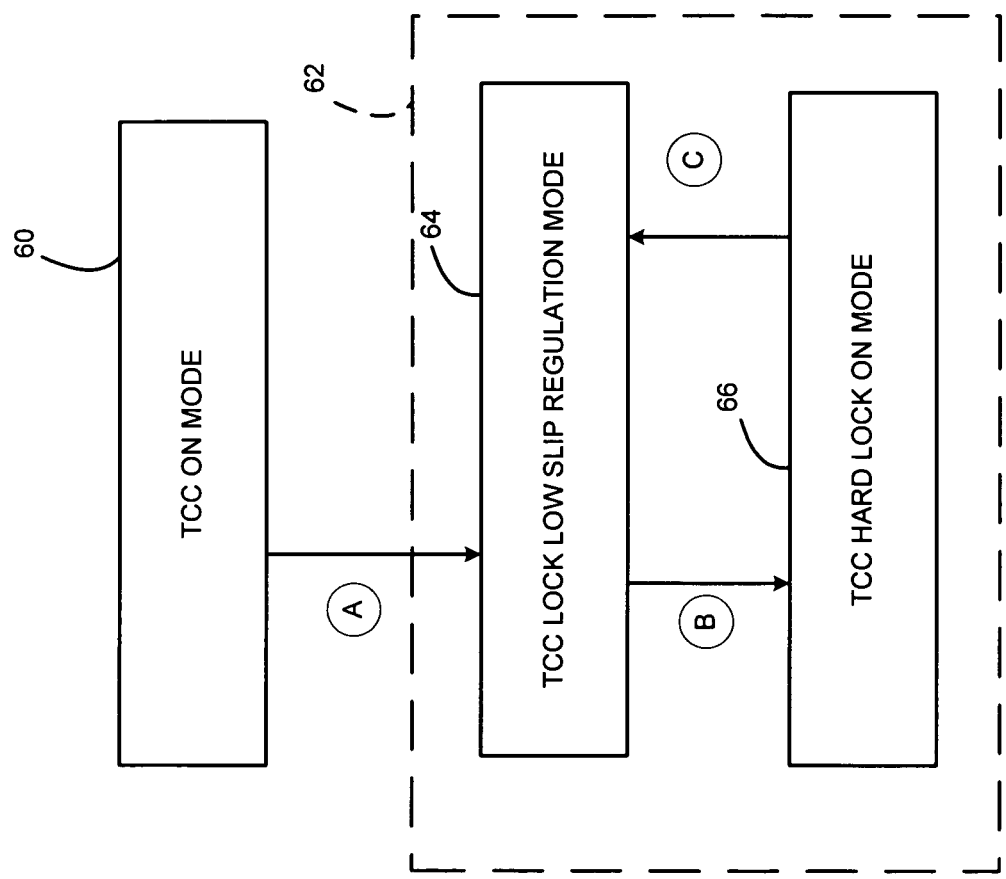
FIG. 3 is a state transition diagram illustrating modes and transitions of the torque converter clutch (TCC) lock on control system.

Referring to FIG. 3, a state transition diagram illustrates how the mode determination module 44 performs the transitions between the on mode 60 and the lock on mode 62 and more particularly the transitions within the lock on mode 62. When in the lock on mode 62, according to the present disclosure, control transitions between a lock low slip regulation sub-mode 64 and a hard lock sub-mode 66. When in the lock low slip regulation mode 64, control commands pressure such that the clutch is essentially locked by maintaining the lowest possible measured slip level. For example, slip may be regulated to 7.5 rpm. When in the hard lock mode 66 a maximum pressure is commanded such that the TCC is fully locked (engine speed is equal to turbine speed.)

The addition of the lock low slip regulation mode 64 allows for pressure to be controlled such that the clutch is fully locked but without any excess capacity at the clutch. Essentially, pressure during this mode is regulated to be only what is necessary to hold the clutch locked. Regulating pressure in this manner during lock conditions reduces engine load and fuel waste and allows for the subsequent release of the clutch to occur more rapidly.

In FIG. 3, the transitions between the modes are labeled A-C. Control determines a desire to transition to the lock on mode 62 based on conventional transition methods. Once it is determined that the lock on mode is desired, control transitions to the lock low slip regulation mode 64 shown at transition A based on the following conditions: 1) if it is the first time entering the TCC lock on mode; 2) if a low slip command is received; 3) if a hard lock request is received, the previous lock on mode was not hard lock, and a slip error is greater than a predetermined threshold; or 4) if the current time is within a specified timeframe before, after, or during an upshift or downshift.

Once in the lock low slip regulation mode 64, control transitions to the hard lock mode 66 shown at transition B based on the following conditions: 1) if a hard lock request is received and the slip error is less than a predetermined threshold; or 2) if a lock low slip request is received, engine torque is greater than a predetermined threshold, and the slip error is less than the predetermined threshold. Control will remain in the hard lock mode 66 when the following conditions are met: 1) if the previous mode was the hard lock mode, engine torque is greater than a predetermined exit threshold, and the lock low slip request is received; or 2) if the previous mode was the hard lock mode and the slip error is greater than a predetermined exit threshold. If the conditions in 2) are met for a predetermined time period, control will transition back to the lock low slip regulation mode 64 shown at transition C. Control transitions out of the low slip regulation mode 64 to other modes (transition not shown) based on conventional transition methods.

As can be appreciated, all comparisons made above can be implemented in various forms depending on the selected values for the thresholds. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Figure 4:
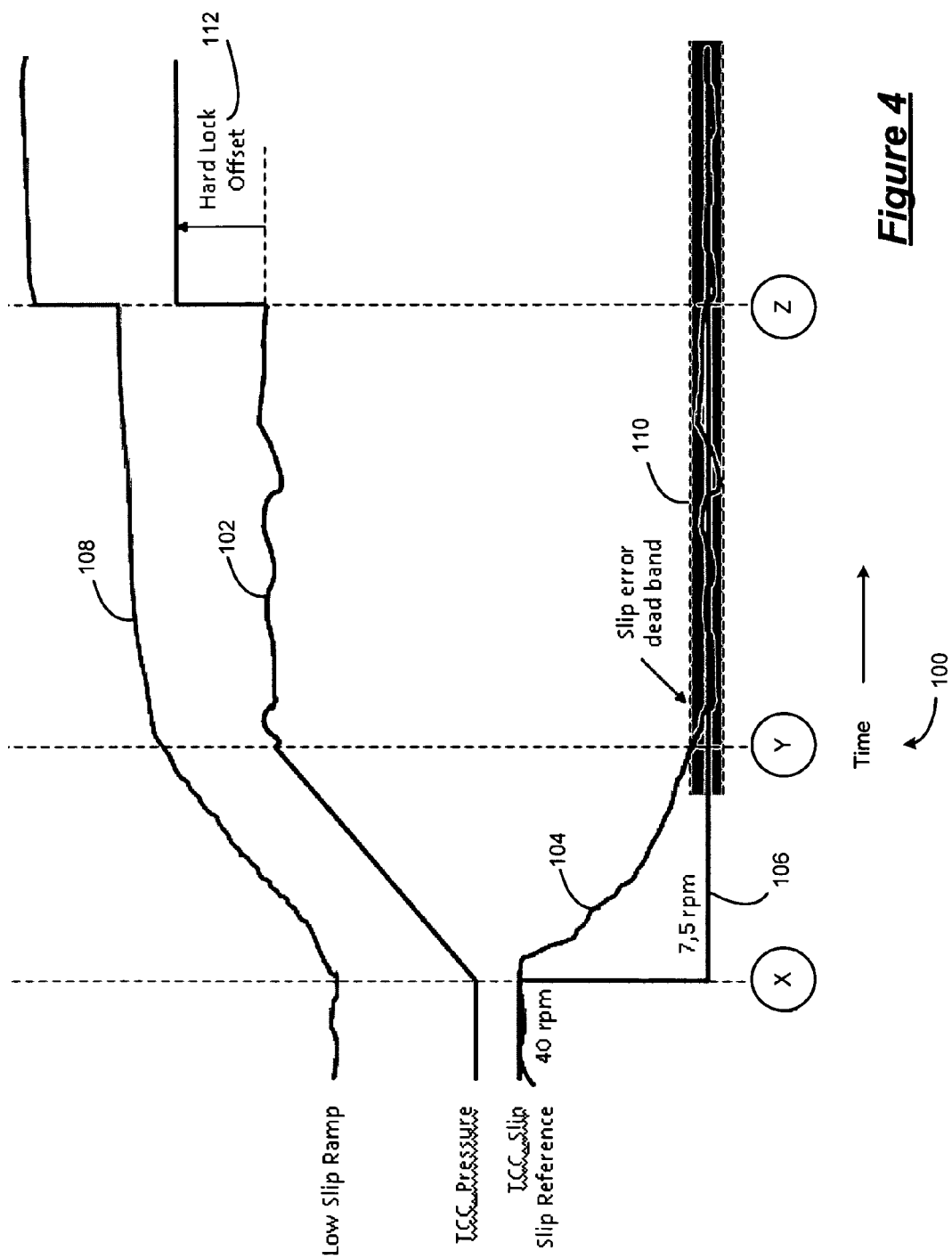
FIG. 4 is a graph illustrating exemplary data output according to the TCC lock on control method.

Referring now to FIG. 4, a graph illustrates an exemplary scenario when entering the lock on mode from the on mode. Time is represented along the x-axis at 100. Data for the pressure supplied to the torque converter is shown at 102. Data for the actual measured slip is shown at 104. Data for the desired slip reference is shown at 106. Data for the low slip ramp is shown at 108. At time X, control transitions from the on mode to the lock low slip regulation mode. A slip deadband is shown at 110. This deadband represents the least values of slip that can be electronically controlled without any measurement inaccuracies of the system. At time Y, slip is regulated near 7.5 rpm to reduce excess capacity behind the clutch. At time Z, control transitions to the hard lock mode where a pressure offset is added to the pressure value to ensure a hard lock of the clutch.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A torque converter clutch control system, comprising:
a mode determination module that receives a lock request to enter a lock mode that includes a lock low slip regulation mode and a hard lock mode, and that selects between the lock low slip regulation mode and the hard lock mode based on the lock request; and
a pressure control module that regulates pressure to a torque converter during the lock low slip regulation mode such that a target slip is maintained and commands a maximum pressure to the torque converter during the hard lock mode to prevent slip.

2. The system of claim 1 wherein the target slip is determined based on torque converter clutch capacity.

3. The system of claim 1 wherein the target slip is at least one of less than and equal to 7.5 revolutions per minute (RPM).

4. The system of claim 1, wherein the mode determination module selects the lock low slip regulation mode if a lock low slip request is received based on engine operating parameters.

5. The system of claim 1 wherein the mode determination module selects the lock low slip regulation mode if a hard lock request is received based on engine operating parameters, a previous mode was not the hard lock mode, and a slip error is greater than a predetermined threshold.

6. The system of claim 1 wherein the mode determination module selects the lock low slip regulation mode if a shift status indicates a current time is within a predetermined time period of at least one of an upshift and a downshift.

7. The system of claim 1 wherein the mode determination module selects the hard lock mode if a hard lock request is received due to engine operating parameters and a slip error is less than a predetermined threshold.

8. The system of claim 1 wherein the mode determination module selects the hard lock mode if a lock low slip request is received due to engine operating parameters, engine torque is greater than a predetermined threshold, and a slip error is less than a predetermined threshold.

9. The system of claim 1 wherein the mode determination module maintains the hard lock mode when a previous mode is the hard lock mode, engine torque is greater than a predetermined exit threshold, and a lock low slip request is received.

10. The system of claim 1 wherein the mode determination module maintains the hard lock mode when a previous mode is the hard lock mode and a slip error is greater than a predetermined exit threshold.

11. The system of claim 1 wherein the mode determination module selects the hard lock mode while in the lock low slip regulation mode if, for a predetermined time period, a previous mode is the hard lock mode, a slip error is greater than a predetermined exit threshold, and a lock low slip request is received.

12. A method of controlling a torque converter clutch (TCC), comprising:
receiving a request to enter a lock mode to lock the torque converter clutch, wherein the lock mode includes a lock low slip regulation mode and a hard lock mode;
selecting between the lock low slip regulation mode and the hard lock mode based on the request;
transitioning to the lock low slip regulation mode when the lock low slip regulation mode is selected; and
commanding pressure such that a target slip is maintained during the lock low slip regulation mode.

13. The method of claim 12 further comprising:
transitioning to the hard lock mode; and
commanding pressure at a maximum pressure such that zero slip is maintained during the hard lock mode.

14. The method of claim 12 wherein the transitioning to the lock low slip regulation mode occurs if a request indicating low slip is received based on engine operating parameters.

15. The method of claim 12 wherein the transitioning to the lock low slip regulation mode occurs if a request indicating a hard lock is received based on engine operating parameters, a previous mode was not the hard lock mode, and a slip error is greater than a predetermined threshold.

16. The method of claim 12 wherein the transitioning to the lock low slip regulation mode occurs if a shift status indicates that a current time is within a predetermined time period of at least one of an upshift and a downshift.

17. The method of claim 13 wherein the transitioning to the hard lock mode occurs if a request indicating hard lock is received due to engine operating parameters and a slip error is less than a predetermined threshold.

18. The method of claim 13 wherein the transitioning to the hard lock mode occurs if a request indicating low slip is received due to engine operating parameters, engine torque is greater than a predetermined threshold, and a slip error is less than a predetermined threshold.

19. The method of claim 13 further comprising maintaining the hard lock mode when a previous mode is the hard lock mode, engine torque is greater than a predetermined exit threshold, and a lock low slip request is received.

20. The method of claim 13 further comprising maintaining the hard lock mode when a previous mode is the hard lock mode and a slip error is greater than a predetermined exit threshold.

21. The method of claim 13 further comprising transitioning from the hard lock mode to the lock low slip regulation mode if, for a predetermined time period, a previous mode is the hard lock mode, a slip error is greater than a predetermined exit threshold, and a request indicating low slip is received.

22. A system for controlling a clutch of a torque converter, comprising:
a mode determination module that selects between a lock low slip regulation mode and a hard lock mode based on a lock request when a lock mode of the clutch is selected, wherein the lock request includes one of a lock low slip request and a hard lock request; and
a pressure control module that regulates pressure to the clutch to allow a predetermined amount of slip between an impeller and a turbine of the torque converter when the lock low slip regulation mode is selected, and that regulates pressure to the clutch to prevent slip between the impeller and the turbine when the hard lock mode is selected.

23. The system of claim 22 wherein the mode determination module selects the lock low slip regulation mode when the hard lock request is received, a previous selected mode was not the hard lock mode, and a slip error is greater than a predetermined threshold.

24. The system of claim 22 wherein the mode determination module selects the hard lock mode when the lock low slip request is received due to engine operating parameters, engine torque is greater than a predetermined threshold, and a slip error is less than a predetermined threshold.

* * * * *